United States Patent
Groenendaal

(10) Patent No.: US 6,751,236 B1
(45) Date of Patent: Jun. 15, 2004

(54) CONFIGURABLE CHANNEL ASSOCIATED SIGNALING ("CAS") LINE SIGNALING USING PLAIN TEXT STRINGS

(75) Inventor: Edward J. Groenendaal, Hornsby (AU)

(73) Assignee: Cisco Technology, Inc., San Jose, CA (US)

(*) Notice: Subject to any disclaimer, the term of this patent is extended or adjusted under 35 U.S.C. 154(b) by 661 days.

(21) Appl. No.: 09/739,093

(22) Filed: Dec. 15, 2000

(51) Int. Cl.$^7$ .................................................. H04J 3/16
(52) U.S. Cl. ........................................ 370/522; 370/466
(58) Field of Search .......................... 379/229; 370/522, 370/523, 524, 252, 254, 442, 347, 466, 467, 468, 351, 352, 470, 461, 462, 2.7, 219, 220, 229, 230

(56) References Cited

U.S. PATENT DOCUMENTS

| | | | |
|---|---|---|---|
| 3,586,980 A | 6/1971 | Krausser | 325/349 |
| 4,131,767 A | 12/1978 | Weinstein | 179/170.2 |
| 4,161,719 A | 7/1979 | Parikh et al. | 340/147 |
| 4,232,199 A | 11/1980 | Boatwright et al. | 179/18 B |
| 4,397,020 A | 8/1983 | Howson | 370/105 |
| 4,532,626 A | 7/1985 | Flores et al. | 370/85 |
| 4,599,494 A | 7/1986 | Welty | 179/84 |
| 4,626,954 A | 12/1986 | Damiano et al. | 361/96 |
| 4,710,949 A | 12/1987 | Ahuja | 379/26 |
| 4,723,267 A | 2/1988 | Jones et al. | 379/93 |
| 4,969,179 A | 11/1990 | Kanare et al. | 379/33 |
| 5,029,201 A | 7/1991 | Bindels | 379/98 |
| 5,056,131 A | 10/1991 | Kanare et al. | 379/33 |
| RE33,900 E | 4/1992 | Howson | 370/105 |
| 5,199,049 A | 3/1993 | Wilson | 375/104 |
| 5,287,537 A * | 2/1994 | Newmark et al. | 712/29 |
| 5,541,957 A | 7/1996 | Lau | 375/258 |
| 5,574,748 A | 11/1996 | Vander Mey et al. | 375/204 |
| 5,608,720 A * | 3/1997 | Biegel et al. | 370/249 |
| 5,655,077 A | 8/1997 | Jones et al. | 395/87.01 |
| 5,659,542 A | 8/1997 | Bell et al. | 370/496 |
| 5,671,354 A | 9/1997 | Ito et al. | 395/187.01 |
| 5,684,950 A | 11/1997 | Dare et al. | 395/187.01 |
| 5,796,185 A | 8/1998 | Takata et al. | 307/140 |
| 5,802,042 A | 9/1998 | Natarajan et al. | 370/255 |
| 5,815,665 A | 9/1998 | Teper et al. | 395/200.59 |
| 5,918,016 A | 6/1999 | Brewer et al. | 395/200.5 |
| 5,944,824 A | 8/1999 | He | 713/201 |
| 5,994,998 A | 11/1999 | Fisher et al. | 340/310.01 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 71/201 |
| 6,092,196 A | 7/2000 | Reiche | 713/200 |
| 6,151,390 A * | 11/2000 | Volftsun et al. | 379/229 |

FOREIGN PATENT DOCUMENTS

WO      99/53408      10/1999      G06F/15/16

\* cited by examiner

*Primary Examiner*—Dang Ton
(74) *Attorney, Agent, or Firm*—Thelen Reid & Priest, LLP; Adrienne Yeung

(57) ABSTRACT

An apparatus for configuring CAS line signaling using plain text strings includes at least one configurable CAS plain text line signal template having corresponding associated CAS signal parameters, a memory to store the configurable CAS plain text line signal template, a trunk controller to receive and transmit the CAS signal parameter, and a processor to match and interpose the configurable CAS plain text line signal template with the associated CAS parameters. The method for configuring CAS line signaling using plain text strings includes defining in a call processor at least one CAS plain text line signal template having corresponding signaling parameters, detecting the signaling parameters, selecting the CAS plain text line signal template using the signaling parameters to create a CAS protocol, and executing the CAS protocol.

32 Claims, 3 Drawing Sheets

CONFIGURABLE CHANNEL ASSOCIATED SIGNALING ("CAS") LINE SIGNALING USING PLAIN TEXT STRINGS

FIELD OF THE INVENTION

This invention relates to a method and system to dynamically configure signal protocols used in public switching telephone network processing devices.

BACKGROUND OF THE INVENTION

Public Switching Telephone network ("PSTN") devices such as Plain Old Telephone Switch ("POTS"), Carrier Switches, Private Branch Exchange switches, Network Access Servers ("NAS"), and the like are all interconnected using Time Division Multiplexed ("TDM") connections to transmit data such as speech between them. Furthermore, these network devices require a means to communicate between the various endpoints to accurately manage the actual voice or data payload on each of the connections. This call management is achieved with the use of signaling to relay call information between the different endpoints. This signaling is in addition to the actual voice or data payload that is transferred over the telephone network. For example, this signaling may transfer the phone numbers used in the telephone network to set up the connection links within the network to interconnect two or more end user devices, such as phones, together. In other examples, this signaling is used to inform the other endpoint of resource availability.

Various signaling protocols and architectures are used to interconnect devices within the PSTN. Over the years, little has changed with respect to the actual voice or data payload transfer over a DS0 timeslot on a TDM trunk. However, the signaling between the various PSTN devices has evolved substantially. Originally, the first digital signaling was designed to be in-band and share the DS0 timeslot with the actual voice or data payload. These TDM trunks were known as Pulse Trunk Signaling ("PTS") trunks. Various flavors of PTS trunks have evolved in different geographical markets to address national regulatory and market requirements. Years later, new signaling architectures evolved to address architectural problems with PTS trunks caused due to the fact that the signaling was still in-bank, such as blue-box fraud. Prime Rate Interface and Basic Rate Interface trunks evolved whereby a dedicated timeslot within a trunk was used for signaling; thus, not having to share a common medium with the voice and data payload such as PTS trunks. Newer signaling architectures such as Signaling System 7 ("SS7") have further changed the PSTN architecture whereby the signaling is being done separately from the trunks transmitting the voice and data payloads, giving more connectivity and management functionality than previously possible at a network wide level. All the signaling formats are predominately standardized and do not deviate from the standard. Furthermore, flavors of all these trunk types coexist in the current PSTN architecture. Although PTS trunks are considered old technology, their low lease access rates make them very popular in many PSTN architectures. This invention will concentrate on a PTS trunk flavor used within PSTN known as Channel Associated Signaling ("CAS").

There exists a number of different CAS signaling types. However, each signaling type has a line or supervisory signaling component, and optionally an address component. The line or supervisory signaling initiate and terminate calls, and the address component which is for communicating the Dialed Number Identification Service ("DNIS") and Automatic Number Identification ("ANI"). This invention will focus on the line or supervisory signaling.

In some equipment, the line signaling components are hard-coded within the software with knobs available on commonly customized parameters. However, there are still cases where the existing knobs do not provide the flexibility required and a development cycle is required to modify the line signaling state machine. To make things more complicated, the line signaling state machine has been implemented in different ways for different platforms in both international and national areas.

Hence, there exists a need for a configurable interface to CAS line signaling to customize or even write entirely new line signaling types in the field so that equipment manufacturers do not need to rewrite software for each platform.

BRIEF DESCRIPTION OF THE INVENTION

An apparatus for configuring CAS line signaling using plain text strings includes at least one configurable CAS plain text line signal template having corresponding associated CAS signal parameters, a memory to store the configurable CAS plain text line signal template, a trunk controller to receive and transmit the CAS signal parameter, and a processor to match and interpose the configurable CAS plain text line signal template with the associated CAS parameters. The method for configuring CAS line signaling using plain text strings includes defining in a call processor at least one CAS plain text line signal template having corresponding signaling parameters, detecting the signaling parameters, selecting the CAS plain text line signal template using the signaling parameters to create a CAS protocol, and executing the CAS protocol.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a configurable CAS line signaling using plain text strings. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays. (FPGAs), application specific integrated circuits (ASICs), or the like, may also be used without departing from the scope and spirit of the inventive concepts disclosed herein.

Figure 1:
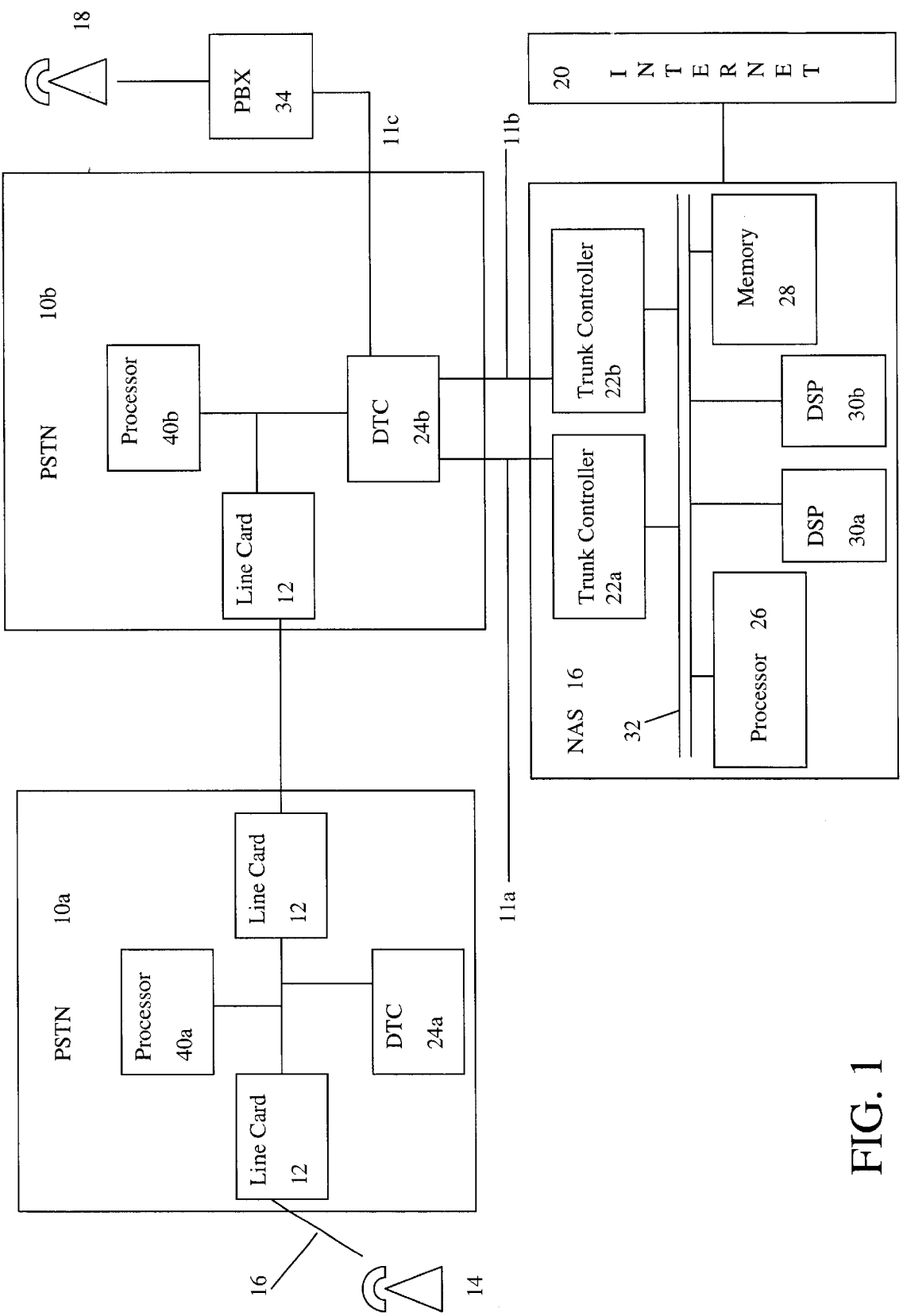
FIG. 1 is a chart describing a specific embodiment of the present invention.

FIG. 1 shows an embodiment of the present invention for establishing communications between a point of origin and destination point. The point of origin and destination point may be two call processors or communications equipment, such as fax, modems, personal computers, telephones, and the like. In FIG. 1, an example of an origin point is shown to be a telephone 14 and the destination point as being an NAS modem 16 and telephone 18. The origin and destination points are not a critical factor since the NAS 16 and telephone 18 may also be the origin point and the telephone 14 the destination point. A NAS 16 is a specialized router call processor that converts voice or data payload to a network such as the Internet 20. A NAS 16 typically maintains numerous digital signal processors (DSP) to act as either a modem, fax, or voice over IP (VoIP) framers (converters).

PSTNs are well known in the art. The PSTN devices are used by the telephone company for switching various incoming calls to different destinations. Generally, call setup information within the PSTN travels from one PSTN 10a switch to another PSTN 10b switch before it reaches its final destination. This call setup, along with possible additional PSTN inter-device communication is done with line signaling. PSTNs 10a, 10b include line cards 12 as well as other communication devices such as a digital trunk controller (DTC) 24a, 24b. The line card 12 is a primary interface into the PSTN 10 from any device connected to the communication line 16 at the origin point. The line card 12 samples an analog data stream transmitted on the communication line 16 and converts it into a digital form. The PSTN 10a, 10b then multiplexes the multiple line card data streams into a single DTC which manages and controls the signaling and payload transfer through the communication lines 16 such as between two PSTNs 10a, 10b or from the PSTN 10a,10b to the destination point, which is the NAS 16 or telephone 18 in FIG. 1. The DTC 24a, 24b, by using time slicing (i.e. allocating a time slot within the trunk to a single call) methods, can compress multiple calls into a single T1 or E1 trunk line (or higher density trunks such as T3/E3) 11a, 11b, 11c. Certain countries, such as the United States, utilize T1 trunk lines 11a,b,c, whereas others, such as European countries, utilize E1 trunk lines 11a,b,c. The T1/E1 trunk lines 11a,b,c provide the physical interfaces for connection to the PSTN device. These trunk lines 11a,b,c are then leased to private companies as CAS, SS7, or other such devices. This invention focuses on CAS trunk lines 11a,b,c in which signaling information is communicated from one device to another where the signaling is associated with the channel (i.e. carried in the same DTC as opposed to other protocols which carry the signaling in a separate channel or in a totally different network).

A call processor or communication device, such as the NAS 16, may comprise of one or more T1 or E1 trunk controllers 22a, 22b as the interface between a PSTN 10b device. The NAS T1 trunk controller 22a, 22b must be programmed with the same signaling protocol as the PSTN 10b DTC 24b for these devices to properly communicate. If the DTC 24b uses proprietary signaling parameters that are not supported by the NAS 16 T1 22a, 22b trunk controller, then these devices will not be able to properly communicate, and calls will not connect. Standards based signaling protocols are hard coded within the NAS 16 and are therefore available for the T1 trunk controller 22a, 22b configuration with little need for understanding the actual signaling specification and without the need to change or modify any hardware or software. However, as previously discussed, line signaling protocols differ according to international and national standards which require carriers to often modify the line signaling protocols of their T1 or E1 trunk controller. Thus, by allowing the NAS 16 T1 trunk controller 22a,22b to support a configurable CAS plain text line signaling protocol, the NAS 16 can be configured to communicate with the DTC 24b on the PSTN 10b as long as the signaling specifications are the same.

The communication device also has a main processor 26 or a dynamically configurable state signaling machine (DCSSM) which manages and executes the software that dictates the functionality and behavior for which the devices were designed for, such as matching one or more of the configurable CAS plain text templates with at least one signaling parameter defined for use with a particular T1 or E1 controller, as further described below. The DCSSM recognizes the CAS plain text line signaling protocols to match with the signaling parameters and may also include an interface through which CAS plain text templates may be added or removed from the DCSSM. The device also has a memory 28 to store the program for the software being executed by the processor as well as the CAS plain text templates to configure data such as timing of the ANIR wink, minimum time between the ANI and the answer, time between detecting KP and ending seize, time between the end of the DNIS and the ANIR wink. If any of these variables are incorrectly timed, then all or some calls will fail to connect.

The NAS 16 further comprises one or more DSPs 30a, 30b which may be used as modems, faxes, or VoIP framers. In a CAS system, the DSPs 30a, 30b are also used to collect and generate multifrequency tones, such as dial tones, for the T1 or E1 trunk controllers 22a, 22b. The processor communicates and controls all the devices within the NAS 16 through a shared communication Bus 32. The communication Bus 32 is used by all of the NAS's 16 internal components to inter-communication with each other. Although the description of the NAS 16 as used in this embodiment, other communication devices may be used in place of the NAS 16, such as the PBX 34. A PBX 34 can execute software to manage inter-company phone calls and only route calls to the PSTN when non-inter-company calls are made. Thus, those skilled in the art will realize that other communication devices other than the NAS 16 may be used to carry out this invention.

This invention additionally provides for a method to configure CAS plain text line signaling templates. Line signaling between DTCs are achieved through the setting of signaling parameters, such as ABCD bits, which are known to those skilled in the art of CAS line signaling, either via a robbed bit signaling mechanism on T1 lines, or a separate DS0s on E1 lines. A user may set each bit with either the number 1 or 0 to determine the state a line is in, such as idle, seized, etc. For example, when there is no incoming call and the line is idle, the ABCD bits may be set to "0100" or if the PSTN sends an answering wink, the ABCD bits are output as "1000." Thus, each CAS line signaling protocol within the DCSSM is simply an input of signaling parameters, such as ABCD line signals and outputs of signaling parameters, such as ABCD line states.

Figure 2:
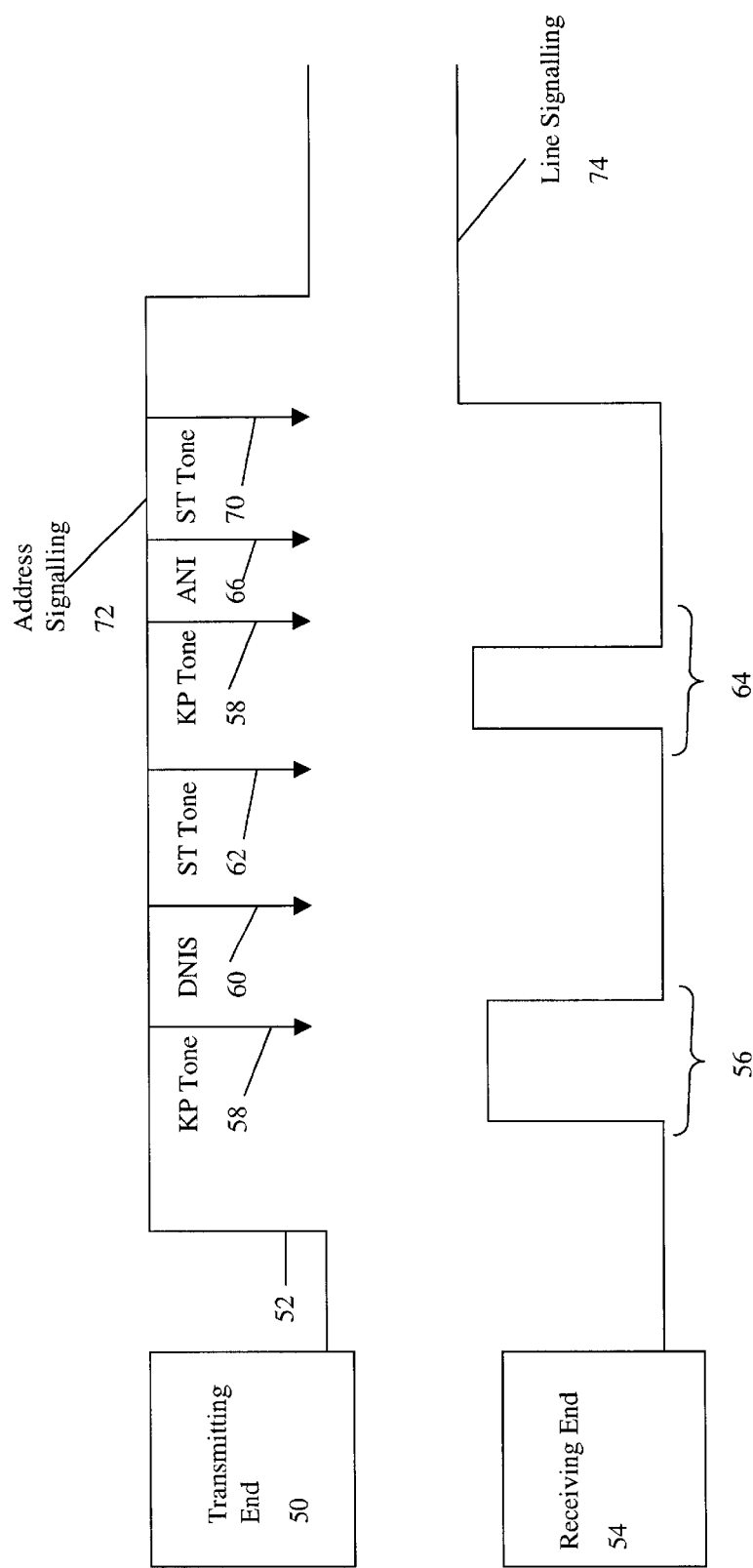
FIG. 2 is an illustration of a CAS protocol used in accordance with a specific embodiment of the present invention.
Figure 3:
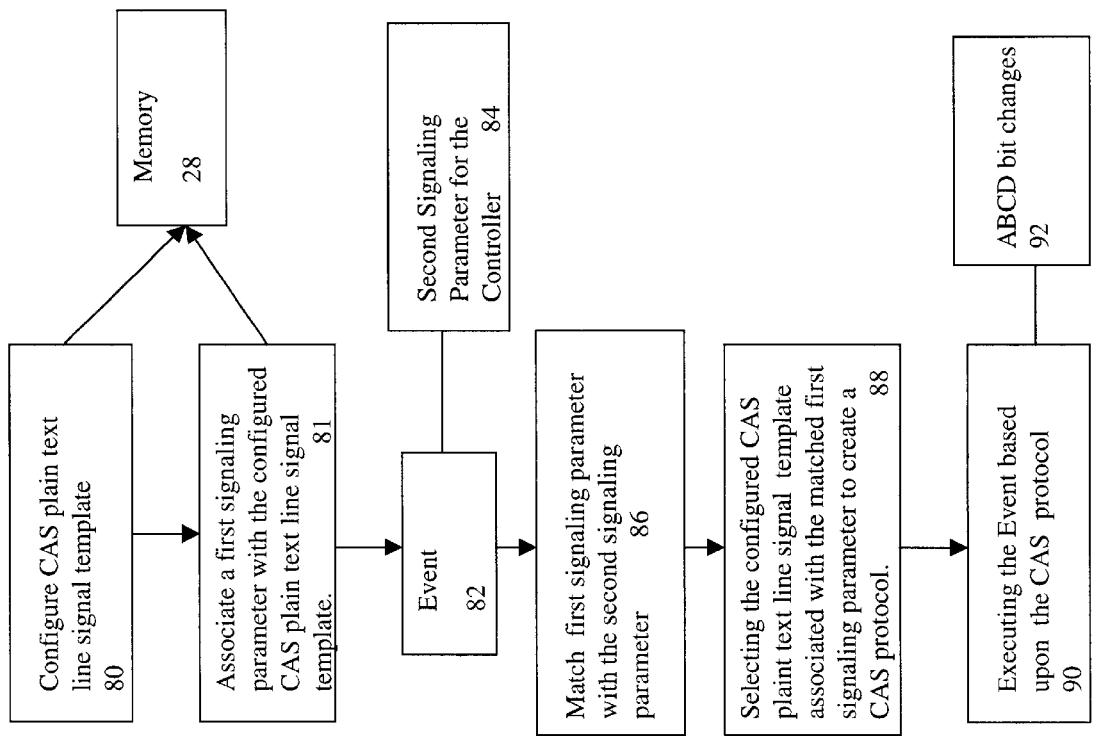
FIG. 3 is a flow chart of a method in accordance with a specific embodiment of the present invention.

The method will be illustrated, as shown in FIG. 2, with an example of a CAS line signal protocol in one embodiment of the present invention. The transmitting or originating end 50 seizes the line 52 (e.g. picks up the phone), and the PSTN or receiving end 54 receives the signal (via the setting of the ABCD bits) in the DTC. The PSTN then sends an answering wink 56 in response to the seize 52. Once the transmitting end receives the wink, it then sends a key pulse (KP) tone 58, a multifrequency tone that signals the start of a pulse, which is detected by the DSP in the PSTN. At this time, the PSTN stops sending the answering wink 56 and both the transmitting 50 and receiving 54 ends are synchronized. The transmitting end 50 then sends the DNIS 60 followed by a signal tone (ST), a multifrequency tone that signals the end of a pulse, which indicates the end of the DNIS 60. In response to the ST tone 62, the PSTN sends a short wink 64 to indicate that it received the DNIS 60 and ST tone 62 and is ready to receive the ANI 66. The transmitting end 50 then sends the ANI 66 between a KP 68 and ST tone 70. The PSTN then plays a call progress tone, in accordance with the CAS protocol, which is either a ringing tone, busy tone, or any other similar call progress tones. The transmitting of the KP, DNIS, ST, and ANI tones are known as address signaling 72. The transmitting of the winks is known as line signaling 74.

When an outgoing call is requested, such as in the above example, Table 1 shows the template directives that can be used in configuring CAS line signaling using plain text strings. The configurable CAS line signaling are configured and programmed by a user or programmer, using the plain text strings, to suite their respective needs. Once programmed, the configured CAS line signal is stored in a memory in the call processor, such as the NAS. The directives may be the setting of line signals, detection of line signals, sending of events to the PSTN, or the detection of events from the PSTN.

In an example, when in idle state, the ABCD bits 1001 is transmitted, and if a line is blocked, the ABCD bits change to 1101 for at least 20 ms. This state could be described in the following way using the plain text string:

"idle@1001|0s(seize)|b(1101, t=20)s(blocked)"

"sieze@0001|b(1101,t=200)s(seizeack)|t(2000)os(idle)"

where the start of each string is the state that the string is describing, followed by the ABCD bits that are to be transmitted during this state. The rest of the string describes each event that may occur, delimited by "|" characters.

TABLE 1

| Character | Meaning |
| --- | --- |
| 0 | Indicates a message requesting that an outgoing call be made. |
| B | The ABCD bits being read are set to the specified value for a time of N ms. (eg. b(1101,t=20) means that the ABCD bits were set to 1101 for at least 20 ms). |
| S | A state change to the specified state (eg. s(blocked) means change to the state with the name "blocked"). |
| t | Starts a time for N ms (eg. t(2000) starts a timer for 2000ms). |
| O | Blocks and waits for the timer to expire. |
| D | The variable being read is set to the specified value for a time of N ms. (eg. d(winktime=20) means that the winktime is set for at least 20 ms). |

In another aspect of the present invention, it is possible to configure and define user-definable variables that can be used in place of the hard-coded variables with the use of plain text strings. As explained above, many prior art network processors were "hard-coded" with the signaling protocol it was to recognize. With standardized signaling protocols this was a trivial task, however, with proprietary signaling protocols this task is lengthy and expensive. Thus, this invention is an improvement over the prior art in that new signaling protocols can be specified with a few plain text strings. Thus, hard-code timer values may be replaced with the following plain text sting:

"vars|d(winktime=20)|d(seizeacktime=200)"

"idle@1001|0s(seize)|b(1101,t=winktime)s(blocked)"

"seize@0001|b(1101,t=seizeacktime)s(seizeack)|t(2000)os(idle)"

Thus, a user or programmer may define and configure the CAS line signals 80 using plain text strings as illustrated above to define CAS protocols through software stored on a computer-readable medium. The computer-readable medium can either be removable (e.g., on a floppy disk or CD-ROM) or fixed (e.g., on a hard drive). However, those skilled in the art will realize that there are other methods which can be implemented. The CAS plain text line signal template protocols are associated with a first signaling parameter. They are then stored in a memory 28 within a communication device, such as the NAS 16. When an event occurs 82, which may be an incoming or outgoing call, the processor 40a, 40b within the PSTN 10a, 10b, looks at the configuration for the T1 or E1 controller for which the call is originating or terminating on and locates a second signaling parameter 84 for that controller. The processor 26 within the communication device, such as the NAS 16, then matches the first signaling parameter with the second signaling parameter 86. The processor then selects the CAS plain text line signal template associated with the matched first signaling parameter to create a CAS protocol 88. The processor 26 then processes the event in accordance to the CAS protocol 90 as described by the selected CAS plain text line signal template 86. The processing of this event and subsequent events or ABCD bit changes 92 by the CAS plain text line signal template 86 are what describe the CAS line signal protocol 90.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for configuring channel associated signaling (CAS) line signaling, comprising:
   defining in a call processor at least one CAS plain text line signal template;
   associating a first signaling parameter with said CAS plain text line signal template;
   detecting the presence of a CAS line signal having a second signaling parameter;
   matching said first corresponding signaling parameter with said second signaling parameter;
   selecting said CAS plain text line signal template associated with said matched first corresponding signaling parameter to create a CAS protocol; and
   executing said CAS protocol.

2. The method of claim 1 wherein said CAS plain text line signal templates are plain text strings.

3. The method of claim 1 wherein said CAS plain text line signal template is user-defined.

4. The method of claim 1 further comprising storing said CAS plain text line signal template in a memory in said call processor.

5. The method of claim 1 wherein said first signaling parameter and said second signaling parameter comprise a plurality of bits.

6. A method for configuring CAS line signaling, comprising:
   defining in a call processor at least one CAS plain text line signal template having an associated fist signaling parameter;
   receiving a call over a controller having a second signaling parameter;
   matching said first signaling parameter of said CAS plain text line signal template with said second signaling parameter;
   selecting said CAS plain text line signal template associated with said matched first signaling parameter to create a CAS protocol; and
   executing said CAS protocol.

7. The method of claim 6 wherein said CAS plain text line signal template are plain text strings.

8. The method of claim 6 wherein said CAS plain text line signal template is user-defined.

9. The method of claim 6 further comprising storing said CAS plain text line signal template in a memory in said call processor.

10. The method of claim 6 wherein said call is an incoming call or outgoing call.

11. The method of claim 6 wherein said first signaling parameter and said second signaling parameter comprise a plurality of bits.

12. An apparatus to configure CAS line signals, comprising:
   a memory to store at least one configurable CAS plain text line signal template having an associated first signaling parameter;
   a trunk controller to receive and transmit a CAS line signal having a second signaling parameter; and
   a processor to match said first signaling parameter with said second signaling parameter, said processor to execute a CAS protocol using said CAS plain text line signal template associated with said matched first signaling parameter.

13. The apparatus of claim 12 wherein said configurable CAS plain text line signal template is user-defined.

14. The apparatus of claim 12 wherein said configurable CAS plain text line signal template further comprising a plurality of plain text strings.

15. The method of claim 12 wherein said first signaling parameter and said second signaling parameter comprise a plurality of bits.

16. An apparatus to configure CAS line signals, comprising:
   a memory to store at least one configurable CAS plain text line signal template having an associated first signal parameter;
   means to transmit and receive a CAS line signal having a second signaling parameter;
   means to match said first signaling parameter with said second signaling parameter;
   means to select said CAS plain text line signal template associated with said matched first signaling parameter to create a CAS protocol; and
   means to execute said CAS protocol.

17. The apparatus of claim 16 wherein said configurable CAS plain text line signal template is user-defined.

18. The apparatus of claim 16 wherein said configurable CAS plain text line signal template further comprises a plurality of plain text strings.

19. The method of claim 16 wherein said first signaling parameter and said second signaling parameter comprise a plurality of bits.

20. An apparatus to configure CAS line signals, comprising:
   means to define in a call processor at least one CAS plain text line signal template having an associated first signaling parameter;
   means to detect the presence of a CAS line signal having a second signaling parameter;
   means to match said first signaling parameter with said second signaling parameter;
   creating a CAS protocol using said CAS plain text line signal template associated with said matched first signaling parameter; and
   means to execute said CAS protocol.

21. The apparatus of claim 20 wherein said CAS plain text line signal template further comprises a plurality of plain text strings.

22. The apparatus of claim 20 wherein said CAS plain text line signal template is user-defined.

23. The apparatus of claim 20 further comprising means to store said CAS plain text line signal template in said call processor.

24. The method of claim 20 wherein said first signaling parameter and said second signaling parameter comprise a plurality of bits.

25. An apparatus to configure CAS line signaling, comprising:
   means to define in a call processor at least one CAS plain text line signal template having an associated first signaling parameter;
   means to receive a call over a port with a second signaling parameter;
   means to detect the presence of said second signaling parameter;
   means to match said first signaling parameter with said second signaling parameter;
   means to select said CAS plain text line signal template associated with said matched first signaling parameter to create a CAS protocol; and means to execute said CAS protocol.

26. The apparatus of claim 25 wherein said CAS plain text line signal template further comprises a plurality of plain text strings.

27. The apparatus of claim 25 wherein said CAS plain text line signal template is user-defined.

28. The apparatus of claim 25 further comprising means to store said CAS plain text line signal template in said call processor.

29. The apparatus of claim 25 wherein said call is an incoming call or outgoing call.

30. The method of claim 25 wherein said first signaling parameter and said second signaling parameter comprise a plurality of bits.

31. A program storage device readable by a machine, tangibly embodying a program of instructions executable by the machine to perform a method for configuring CAS line signaling, said method comprising:

defining in a call processor at least one CAS plain text line signal template;

associating a first signaling parameter with said CAS plain text line signal template;

detecting the presence of a CAS line signal having a second signaling parameter;

matching said first corresponding signaling parameter with said second signaling parameter;

selecting said CAS plain text line signal template associated with said matched first corresponding signaling parameter to create a CAS protocol; and executing said CAS protocol.

32. A program storage device readable by a machine, tangibly embodying a program of instructions executable by the machine to perform a method for configuring CAS line signaling, said method comprising:

defining in a call processor at least one CAS plain text line signal template having an associated fist signaling parameter;

receiving a call over a controller having a second signaling parameter;

matching said first signaling parameter of said CAS plain text line signal template with said second signaling parameter;

selecting said CAS plain text line signal template associated with said matched first signaling parameter to create a CAS protocol; and executing said CAS protocol.

* * * * *